United States Patent
Straub et al.

(10) Patent No.: US 8,374,908 B2
(45) Date of Patent: Feb. 12, 2013

(54) COMPUTER SYSTEM AND COMPUTER-BASED METHOD FOR ASSESSING THE SAFETY OF A PROCESS INDUSTRY PLANT

(75) Inventors: Ulrich Straub, Zurich (CH); Ernst Zirngast, Kindhausen (CH)

(73) Assignee: Swiss Reinsurance Company Ltd., Zürich (CH)

( * ) Notice: Subject to any disclaimer, the term of this patent is extended or adjusted under 35 U.S.C. 154(b) by 1160 days.

(21) Appl. No.: 12/089,575

(22) PCT Filed: Oct. 14, 2005

(86) PCT No.: PCT/CH2005/000602
§ 371 (c)(1),
(2), (4) Date: Oct. 10, 2008

(87) PCT Pub. No.: WO2007/041875
PCT Pub. Date: Apr. 19, 2007

(65) Prior Publication Data
US 2009/0073171 A1 Mar. 19, 2009

(51) Int. Cl.
*G06Q 10/00* (2012.01)
(52) U.S. Cl. ...................... 705/7.39; 705/7.38
(58) Field of Classification Search ............. 705/7.38, 705/7.39
See application file for complete search history.

(56) References Cited

U.S. PATENT DOCUMENTS

| | | | | |
|---|---|---|---|---|
| 7,958,001 | B2 * | 6/2011 | Abbadessa et al. | 705/7.38 |
| 2004/0088329 | A1 * | 5/2004 | Lundblad et al. | 707/104.1 |
| 2006/0259471 | A1 * | 11/2006 | Droubie et al. | 707/3 |

OTHER PUBLICATIONS

Chang, et al., "Performance Evaluation of Process Safety Management Systems of Paint Manufacturing Facilities," 2009, Journal of Loss Prevention in the Process Industries, vol. 22, pp. 398-402.*

* cited by examiner

*Primary Examiner* — R. David Rines
*Assistant Examiner* — Amanda Gurski
(74) *Attorney, Agent, or Firm* — Oblon, Spivak, McClelland, Maier & Neustadt, L.L.P.

(57) ABSTRACT

A method and system to establish a safety assessment of a process industry plant including multiple organizational units. The method and system store scores relating to a rating of one of an inspection, undertaken in one of the organizational units regarding an aspect of the plant, and an answer, given by a human representative of one of the organizational units in response to defined questions relating to one of the aspects. The scores are assigned to respective of the organizational units and respective of the aspects. Aspect-specific scores are then calculated. Safety assessment can then be established from the aspect-specific scores of the organizational units.

20 Claims, 5 Drawing Sheets

COMPUTER SYSTEM AND COMPUTER-BASED METHOD FOR ASSESSING THE SAFETY OF A PROCESS INDUSTRY PLANT

FIELD OF THE INVENTION

The present invention relates to a computer system and a computer-based method for assessing the safety of a process industry plant. Specifically, the present invention relates to a computer system and computer-based method for establishing a safety assessment of a process industry plant comprising multiple organizational units.

BACKGROUND OF THE INVENTION

The process industry, e.g. the petrol industry, is generally based on the cascading effect of various unit operations. In other words, the process industry typically relies on input/output systems where an input material is processed into an output product through sequential steps performed at a series of cascaded components of the system. Interruption at any point in the system causes the overall process to stop. Consequently, interruption of process steps causes downtime, which results in loss of production. It is therefore of general interest to reduce downtime, increase mean time between failures and prevent deterioration of equipment in the processing plants. Also in order to prevent harm of humans and environment, it is of great interest to ensure that there are no accidents in the processing plant. Unfortunately, the process industry has witnessed some major disasters, for example the disasters of Bhopal (India, 1984), Flixoborough (England, 1974) or Seveso (Italy, 1976). Reasons for the above disasters have been attributed to inadequacies in safety management, e.g. to negligence, not working in accordance with engineering practices and inadequate maintenance plan. Process safety management is essential for preventing accidents and reducing downtime. To monitor and improve process safety management, it is also necessary to assess the safety of a process industry plant.

SUMMARY OF THE INVENTION

It is an object of this invention to provide a computer system and a computer-based method for assessing the safety of a process industry plant comprising multiple organizational units.

According to the present invention, these objects are achieved particularly through the features of the independent claims. In addition, further advantageous embodiments follow from the dependent claims and the description.

According to the present invention, the above-mentioned objects are particularly achieved in that, for establishing a safety assessment of the process industry plant, stored in a computer are scores, wherein each score is related to a rating of an inspection, undertaken in one of the plant's organizational units with regards to one of multiple defined aspects of the plant, and/or an answer, given by a human representative of one of the plant's organizational units in response to one of a set of defined questions, each question being related to one of the aspects. The process industry plant includes organizational units such as top management, operation, engineering, inspection, maintenance, and/or loss prevention. For example, the organizational units relate to hierarchical levels of the plant. The defined aspects can be seen as different safety relevant aspects of the plant and include, for example, an aspect of organization, an aspect of resources, an aspect of communication, an aspect of training, an aspect of procedures, an aspect of contingency plan, and/or an aspect of general safety. In the computer, each of the aforementioned scores is assigned to the respective one of the organizational units and to the respective one of the aspects. The questions include, for example, questions related to safety awareness, safety behavior, change management, and/or human error. After storing the scores in the computer, calculated in the computer are aspect-specific scores for each one of the organizational units from the scores assigned to the respective one of the organizational units and to the respective one of the aspects. If there is one worst case score assigned to a particular one of the organizational units for a particular aspect, a worst-case aspect-specific score is assigned to the particular one of the organizational units with respect to the particular aspect. Finally, the safety assessment is established from the aspect-specific scores of the organizational units. Calculating aspect-specific scores for each one of the organizational units and establishing the safety assessment from these aspect-specific scores make it possible to compare safety levels with regards to specific aspects directly between organizational units having different levels and areas of responsibilities and expertise. Assigning worst case aspect-specific scores to organizational units having at least one worst case score assigned to the particular aspect makes it possible to implement a rating philosophy, in which failure of basic requirements can be weighted such that they are not compensable by positive scores received for other inspections and/or questions related to the respective aspect. Clear and explicit indication of a failure of basic requirements is advantageous because any failure of basic requirements represents a latent failure, which can possibly cause incidents resulting in accidents and/or down time.

In a preferred embodiment, generated by the computer is a graphical representation in one common graph of the safety assessment of a selected one of the organizational units. The aspect-specific scores of the selected one of the organizational units is shown in the graph such that deficiencies of the aspect-specific scores from a best-case score are visualized and such that differences between the aspect-specific scores of the selected one of the organizational units are visualized. Displaying the calculated aspect-specific scores of an organizational unit in one common graph makes possible an efficient overview of a safety assessment of an organizational unit with regards to the various (safety) aspects defined for the plant, wherein aspect-specific scores of an organizational unit can be directly compared in the graph. Without the necessity of reading a written report, departmental deficiencies concerning specific (safety) aspects are visible at one glance.

Preferably, different safety assessments are established at different points in time. Aspect-specific scores associated with the different safety assessments are stored in the computer assigned to data about the respective point in time. Generated by the computer is a graphical representation in one common graph of the different safety assessments of a selected one of the organizational units. The graphical representation is generated in one common graph such that differences are visualized between the aspect-specific scores associated with the different safety assessments of the selected one of the organizational units. Establishing multiple safety assessments at different points in time and displaying related aspect-specific scores of an organizational unit for the different points in time in one common graph make it possible to view efficiently and at one glance a department's improvements and/or deteriorations with regards to the different (safety) aspects.

In an embodiment, calculated in the computer are total aspect-specific scores for the plant from the aspect-specific scores of the organizational units. Furthermore, generated by the computer is a graphical representation in one common graph of the safety assessment of the plant. The total aspect-specific scores are shown in the graph such that deficiencies of the total aspect-specific scores from a best-case total score are visualized and such that differences between the total aspect-specific scores are visualized.

Calculating total aspect-specific scores for the plant and displaying these total scores in one common graph makes possible an efficient overview of a safety assessment of the plant with regards to the various (safety) aspects defined for the plant, wherein the total aspect-specific scores can be directly compared in the graph. Without the necessity of reading a written report, the plant's deficiencies concerning specific (safety) aspects are visible at one glance.

In a further embodiment, data about inspections and/or answers is stored in the computer. Subsequently, determined in the computer is the rating of the inspection and/or the answer by means of an expert system from the data about inspections and/or answers. Automated rating of inspections and/or answers increases efficiency as well as consistency of the rating process.

In addition to a computer system and a computer-based method for establishing the safety assessment of a process industry plant, the present invention also relates to a computer program product including computer program code means for controlling one or more processors of a computer such that the computer executes the method for establishing the safety assessment of the process industry plant, particularly, a computer program product including a computer readable medium containing therein the computer program code means.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
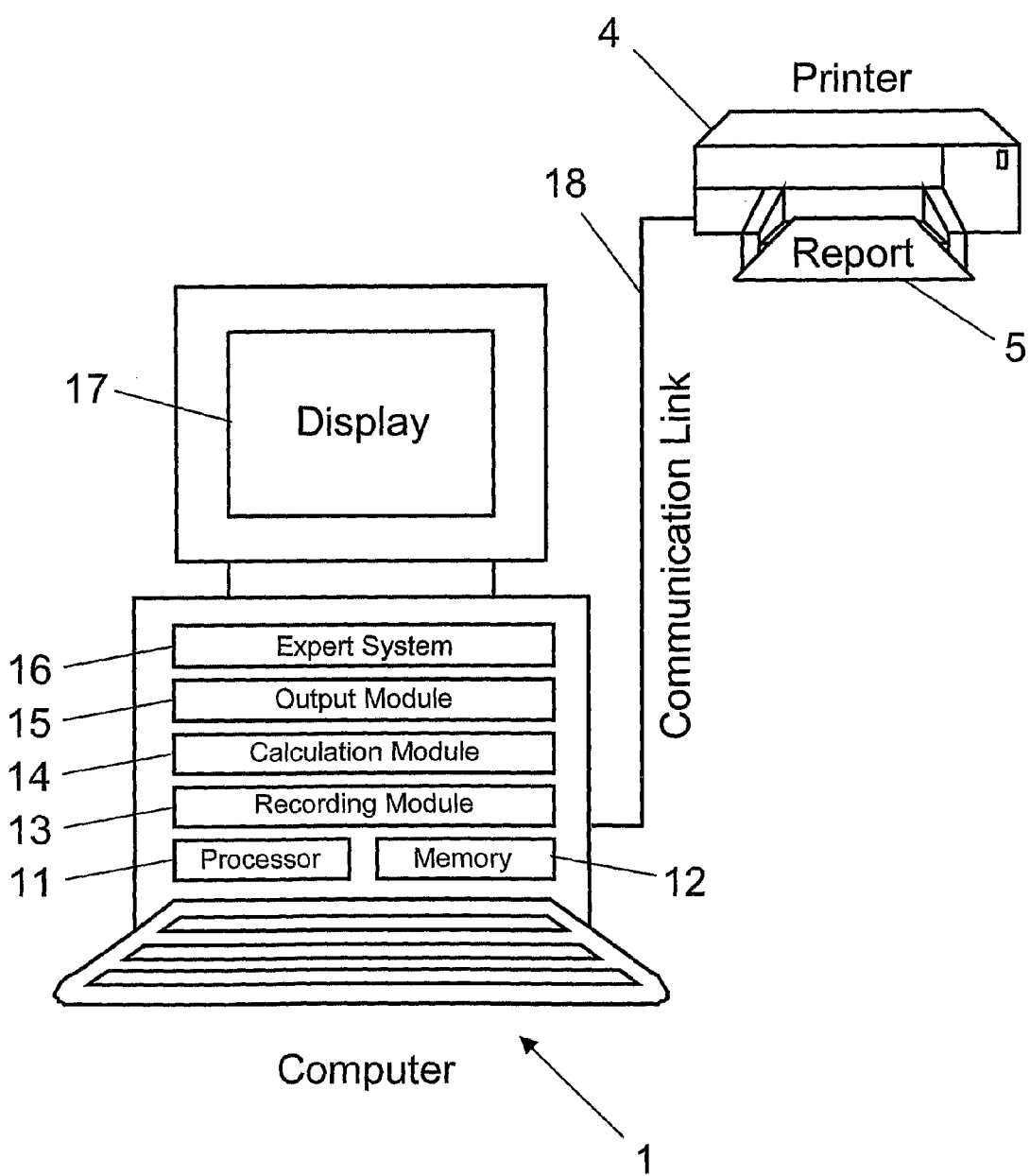
FIG. 1 shows a block diagram illustrating schematically an exemplary configuration of a system for practicing embodiments of the present invention, said configuration comprising a computer with a display, a processor, a keyboard, and memory.

In FIG. 1, reference numeral 1 refers to a computer, for example a personal computer. As is illustrated schematically, computer 1 includes a display 17, at least one processor 11, memory 12 for storing data and programs, as well as functional modules, namely a recording module 13, a calculation module 14, an output module 15, and optionally an expert system 16. Preferably, the functional modules are implemented as programmed software modules. The computer program code of the software modules is part of a computer program product and is preferably stored in computer 1 on a computer readable medium connected fixed or removably to computer 1. One skilled in the art will understand that the functional modules can also be implemented fully or in part by means of hardware. The various functions of the functional modules are described below in more detail with reference to FIGS. 2, 3 and 5. For producing printed output, the computer 1 is connected via communication link 18 to printer 4. Communication link 14 includes a cable and/or network connection.

Figure 2:
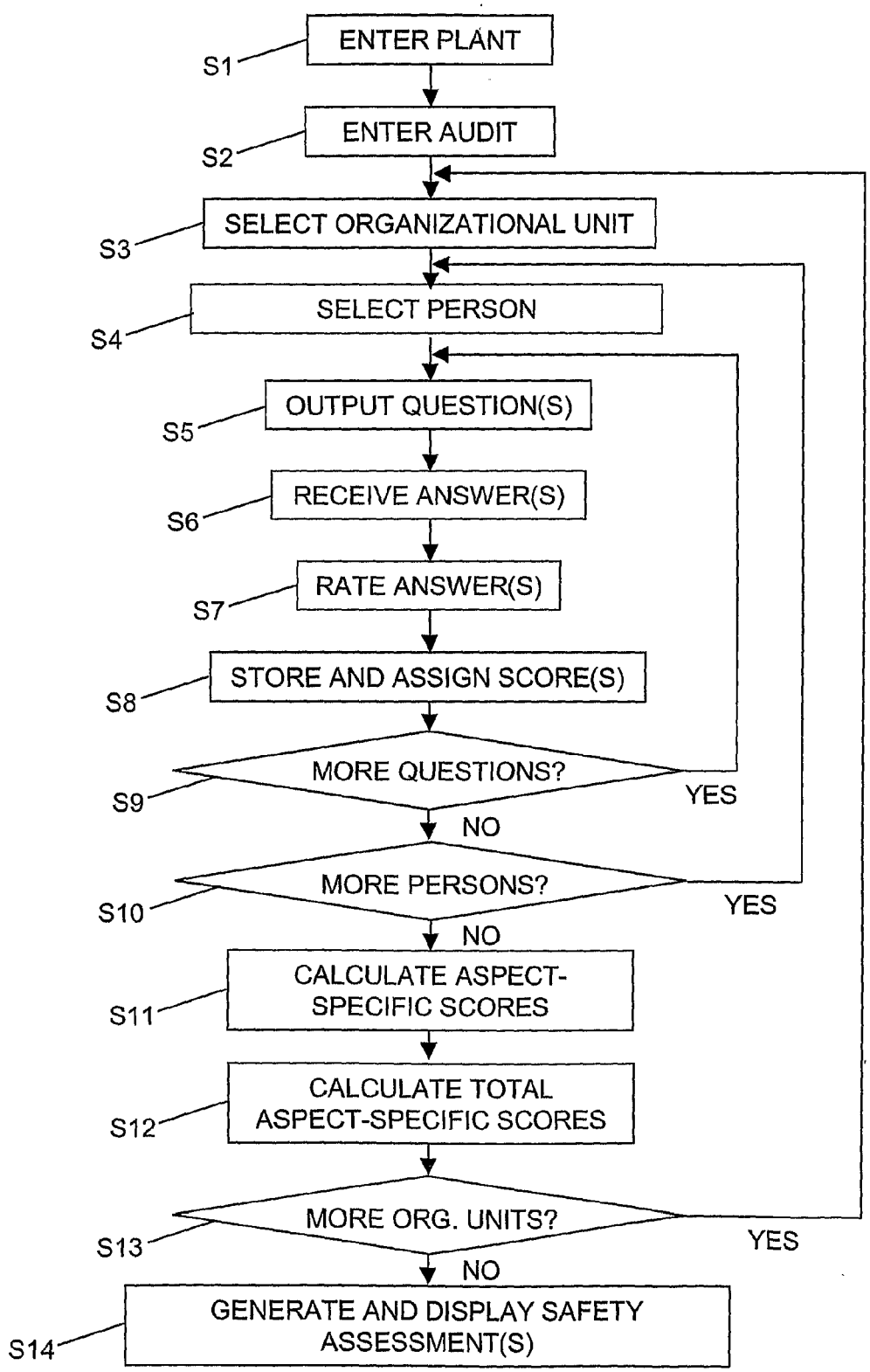
FIG. 2 shows a flow diagram illustrating an example of a sequence of steps executed according to the present invention.
Figure 3:
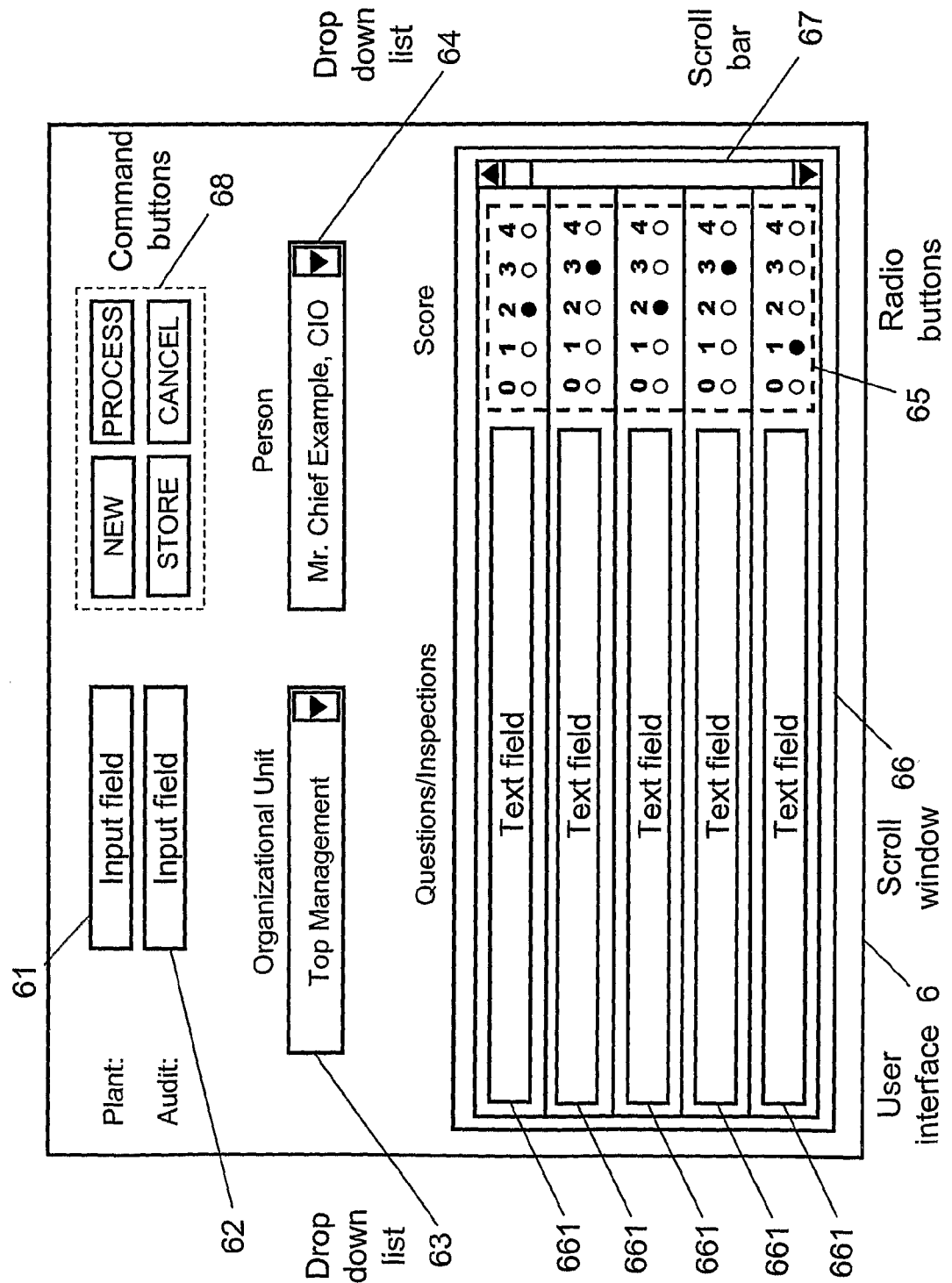
FIG. 3 shows an exemplary layout of a user interface for controlling execution of embodiments of the present invention.
Figure 5:
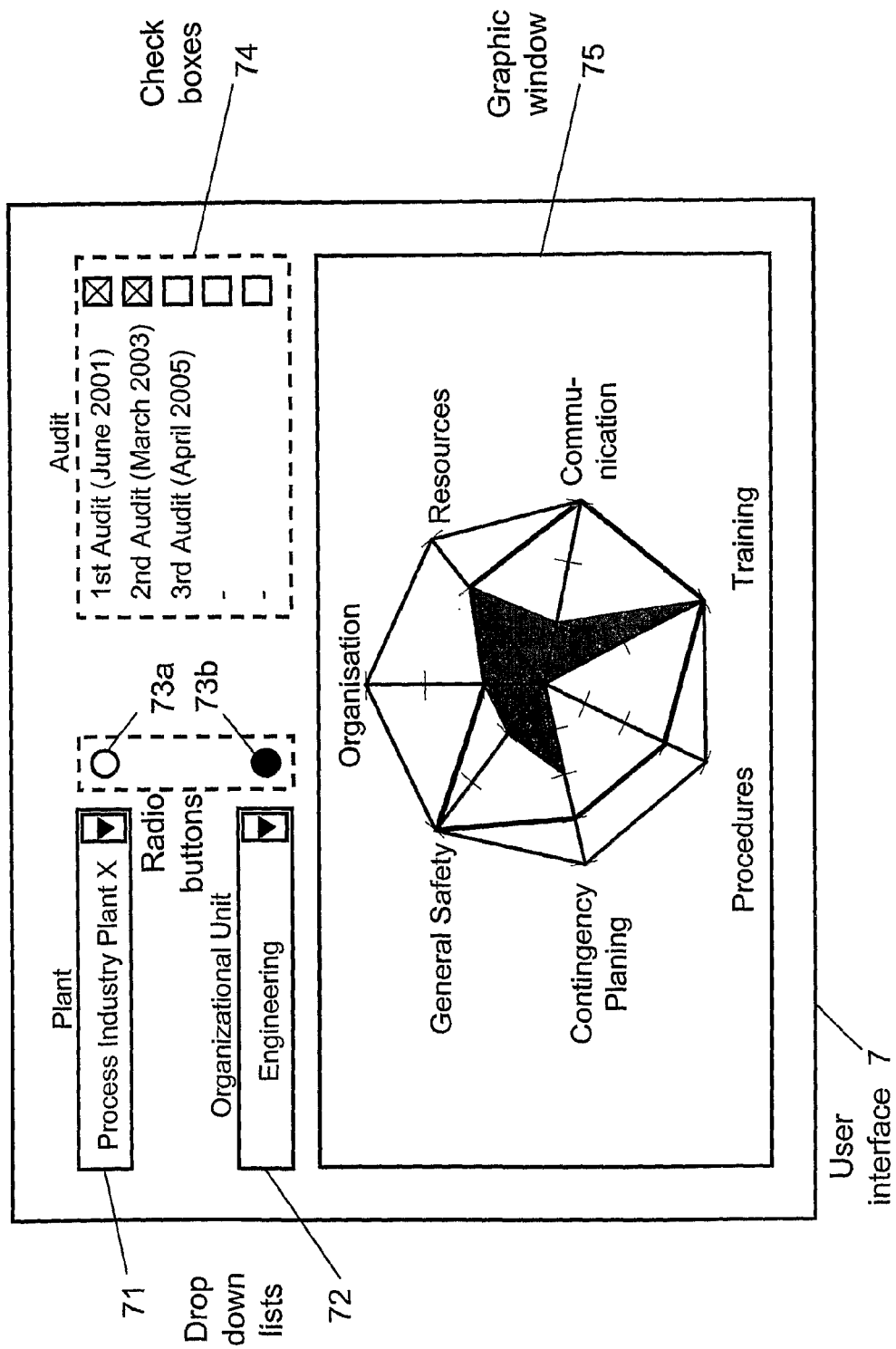
FIG. 5 shows a further exemplary layout of a user interface for controlling execution of embodiments of the present invention.

In the following paragraphs, execution of steps of the proposed method is described with reference to FIGS. 2, 3 and 5. FIG. 2 shows a flow diagram illustrating a possible sequence of the steps of the proposed method. FIG. 3 shows a possible graphical user interface 6, provided by the recording module 13 and displayed on display 17, for controlling execution of the proposed method and for exchanging data with computer 1. FIG. 5 shows a possible graphical user interface 7, provided by the output module 15 and displayed on display 17, for controlling the computer's output of established safety assessments.

In step S1, information for identifying a process industry plant is entered into computer 1. In user interface 6, information for identifying the organization is entered as a name or code in input field 61. The organization can also be selected from a pick list, e.g. by means of a drop down list.

In step S2, information for defining an audit or safety assessment is entered into computer 1. This information is entered as an audit number, audit name, and/or audit date in input field 62. The audit or safety assessment can also be selected from a pick list, e.g. by means of a drop down list. Preferably, stored with the information for defining an audit or safety assessment is data about the point in time (date, time) of the audit or safety assessment.

In step S3, an organizational unit of the plant specified in step S1 is selected in computer 1. In user interface 6, the organizational unit is selected from drop down list 63, however, it is also possible to enter the organizational unit through an input field or by other means, e.g. radio buttons. The organizational units include "Top management", "Operation", "Engineering", "Inspection", "Maintenance", and "Loss Prevention", for example. In an embodiment, the organizational units relate to hierarchical levels of the plant, for example top management, middle management, supervisors, foremen, workers, etc In the example shown in FIG. 3, the organizational unit "Top Management" is selected.

In step S4, a person (i.e. an interviewee) of the organizational unit, selected in step S3, is selected in computer 1. In user interface 6, the person is selected from drop down list 64. Preferably the drop down list is populated by computer 1 based on the plant, selected in step S1, and the organizational unit, selected in step S3. However, it is also possible to enter the person as a name or code through an input field.

TABLE 1

| Question | | Safety relevant |
| --- | --- | --- |
| Identification | Content | aspect |
| $q_1$ | $t_1$ | Organization |
| $q_2$ | $t_2$ | Organization |

TABLE 1-continued

| Question | | Safety relevant |
|---|---|---|
| Identification | Content | aspect |
| ... | ... | ... |
| $q_i$ | $t_i$ | Resources |
| $q_{i+1}$ | $t_{i+1}$ | Resources |
| ... | ... | ... |
| $q_j$ | $t_j$ | Communication |
| $q_{j+1}$ | $t_{j+1}$ | Communication |
| ... | ... | ... |
| $q_n$ | $t_n$ | General safety |

In step S5, one or more defined questions are provided as output. In user interface 6, the questions are provided in the form of text displayed in text fields 661. In the example of FIG. 3, multiple questions are displayed concurrently in scroll window 66. Scroll window 66 is controlled by means of scroll bar 67. The questions could also be provided in the form of audible spoken text. It is also possible to produce a printed output of the questions on printer 4. The questions are stored in memory 12 or on a data carrier inserted in computer 1. As is illustrated in Table 1, each question includes an identification $q_1, q_2, \ldots, q_i, q_{i+1}, \ldots, q_j, q_{j+1}, \ldots, q_n$ and content $t_1, t_2, \ldots, t_i, t_{i+1}, \ldots, t_j, t_{j+1}, \ldots, t_n$. The content $t_1, t_2, \ldots, t_i, t_{i+1}, \ldots, t_j, t_{j+1}, \ldots, t_n$ includes alphanumeric text data, audio data, or encoded speech information. The content of the questions is related to issues such as safety awareness, safety behavior, change management, and human error. As is also illustrated in Table 1, each of the questions is assigned to one of several safety relevant aspects defined for the plant: aspect of organization, resources, communication, training, procedures, contingency plan, and general safety.

In step S6, answers are received for each of the questions provided as output in step S5. For example, the questions are received by a human interviewer. The answers could also be received and stored by computer 1 in the form of data. For example, answer date includes text or codes entered into an input field (not illustrated) of user interface 6, or audio or encoded speech information entered by means of a microphone, audio processor, and speech processor.

In step S7, the answers received in step S6 are rated. In user interface 6, for answers received in step S6, scores ranging from low ("0") to high ("4") can be assigned manually to the respective questions. As illustrated in Table 2, the answers are rated depending on whether the question indicates that in the respective plant's organizational unit proactive process safety management is being followed (best score), that process safety management is being driven by current experiences (first level score), that accepted process safety management practices are being followed (second level score), that basic (safety) requirements are being met (third level score), or that the basic requirements are not being met (worst level score).

TABLE 2

| Assessment of answer/inspection | Ranking level | Numeric score |
|---|---|---|
| Proactive process safety management | Best case score | 4 |
| Current experience driven process safety management | First level score | 3 |
| Accepted process safety management practice | Second level score | 2 |
| Basic requirements | Third level score | 1 |
| Absence of basic requirements | Worst case score | 0 |

In the example of FIG. 3, scores are entered by clicking one of the radio buttons 65 assigned to the questions. For example, the answer received for the question listed at the top of scroll window 66 was rated with a second level score ("2"). Answer data stored by computer 1 in step S5 could also be rated automatically by the computer 1, for example by means of rules based expert system 16.

In step S8, computer 1 stores in memory 12 the scores assigned to the answers received for the questions. As is illustrated in Table 3, each score is assigned to the question $q_1, q_2, \ldots, q_n$ and safety relevant aspect for which the particular answer was received. Moreover, information for identification of the person $p_1, p_2, \ldots, p_t$ providing the answer and the organizational unit represented by that person is assigned to each score.

If it is determined in step S9 that there are more questions to be provided as output, the next activated question or set of questions is provided in step S5. Otherwise, if there are no more questions to be provided and if scores have been assigned to all questions for answers provided thereto, the method continues in step S10.

TABLE 3

| Question identification | Safety relevant aspect | Organizational unit | Person | Score |
|---|---|---|---|---|
| $q_1$ | Organization | Top Management | $p_1$ | "3" |
| $q_2$ | Organization | Top Management | $p_1$ | "4" |
| ... | ... | ... | ... | ... |
| $q_{13}$ | Resources | Operation | $p_2$ | "2" |
| ... | ... | ... | ... | ... |
| $q_{23}$ | Communication | Engineering | $p_4$ | "0" |
| $q_{24}$ | Communication | Engineering | $p_4$ | "4" |
| ... | ... | ... | ... | ... |
| $q_{35}$ | Training | Inspection | $p_6$ | "3" |
| ... | ... | ... | ... | ... |
| $q_{48}$ | Procedures | Maintenance | $p_{t-1}$ | "4" |
| $q_{49}$ | Contingency Plan | Maintenance | $p_{t-1}$ | "2" |
| ... | ... | ... | ... | ... |
| $q_n$ | General Safety | Loss Prevention | $p_t$ | "3" |

In step S10, it is determined whether further persons are to be included in the safety assessment of the plant's organizational unit or whether processing of the collected data should continue in step S11. In user interface 6, this decision can be controlled by the user, for example the interviewer, by means of the command buttons 68. For example, by clicking the "NEW" command button further persons can be added or by clicking the "PROCESS" command button initiated is the calculation of aspect-specific scores for the organizational unit as well as the calculation of total aspect-specific scores for the plant. At any time entered data can be stored by clicking the "STORE" command button or ignored by clicking the "CANCEL" command button. Additional functions, for example functions for accessing and managing stored information related to a specific plant, audit, organizational unit, or person, can be invoked by control means such as pull down menus or command buttons not illustrated in FIG. 3. Particularly, it is possible to add further persons, organizational units, plants, or audits at any point in time. Based on a personnel list, for example, the decision of step S10 could also be taken automatically by the computer 1, as soon as the data for all persons of the organizational unit has been recorded.

In step S11, calculation module 14 of computer 1 calculates and stores the aspect-specific scores for the organizational unit selected in step S3. Table 4 shows an example of aspect-specific scores calculated for all the organizational units of the plant defined in step S1. The aspect-specific scores of an organizational unit are calculated in computer 1 by adding up all scores for a safety relevant aspect assigned in step S8 to the organizational unit. Preferably, the aspect-specific score is adjusted (divided) by the number of persons interviewed in an organizational unit. However, if any answer to a question was rated with a worst case score ("0"), the aspect-specific score for the organizational unit is set to the worst case score for the safety related aspect assigned to the respective question. For example, as can be seen in Table 3, question $q_{23}$ related to the aspect "Communication" was rated with the worst case score for the organizational unit "Engineering". Consequently, as illustrated in Table 4, a worst case aspect-specific score is assigned to the organizational unit "Engineering" for the aspect "Communication", despite the fact that question $q_{24}$, also related to the aspect "Communication", was rated with a best case score. Depending on the embodiment, a worst case rating of one person's answer is sufficient for a worst case aspect-specific score, or the answers of all the persons of an organizational unit must be rated with a worst case score for a worst case aspect-specific score. It is also possible to assign a worst-case aspect-specific score based on a threshold defined for the scores from the answers of the interviewed persons of an organizational unit.

TABLE 4

| Aspect | Organizational Unit | | | | | |
|---|---|---|---|---|---|---|
| | Top Management | Operation | Engineering | Inspection | Maintenance | Loss Prevention |
| Organization | 8 | 5 | 8 | 7 | 10 | 5 |
| Resources | 8 | 15 | 13 | 30 | 23 | 15 |
| Communication | 7 | 15 | 0 | 10 | 8 | 5 |
| Training | 2 | 13 | 2 | 4 | 3 | 11 |
| Procedures | 5 | 24 | 18 | 48 | 14 | 11 |
| Contingency Plan | 9 | 7 | 2 | 3 | 3 | 16 |
| General Safety | 6 | 11 | 17 | 3 | 16 | 16 |

In Table 4, the aspect-specific score for "Communication" reached by the organizational unit "Top Management" amounts to 7, for example, whereas the aspect-specific score for "General Safety" reached by the organizational unit "Loss Prevention" amounts to 16.

In step S12, calculation module 14 of computer 1 calculates and stores the plant's total aspect-specific scores for its organizational units. The total aspect-specific scores of a plant are calculated in computer 1 by adding up for each safety relevant aspect the respective aspect-specific scores of the plant's organizational units as calculated and stored in step S11. Table 5 shows an example of total aspect-specific scores calculated for the plant defined in step S1. In an embodiment, a worst-case score is assigned to a total aspect-specific score of the plant, if a respective worst-case aspect specific score is assigned to just one (or more) of the plant's organizational units.

In step S13, it is determined whether further organizational units are to be included in the safety assessment or whether processing of the collected data should continue in step S14. In user interface 6, this decision can be controlled by the user, for example the interviewer, by means of the command buttons 68, as was discussed in the context of step S10.

TABLE 5

| Aspect | Total Aspect-Specific Scores |
|---|---|
| Organization | 43 |
| Resources | 104 |
| Communication | 45 |
| Training | 35 |
| Procedures | 120 |
| Contingency Plan | 40 |
| General Safety | 69 |

Figure 4A:
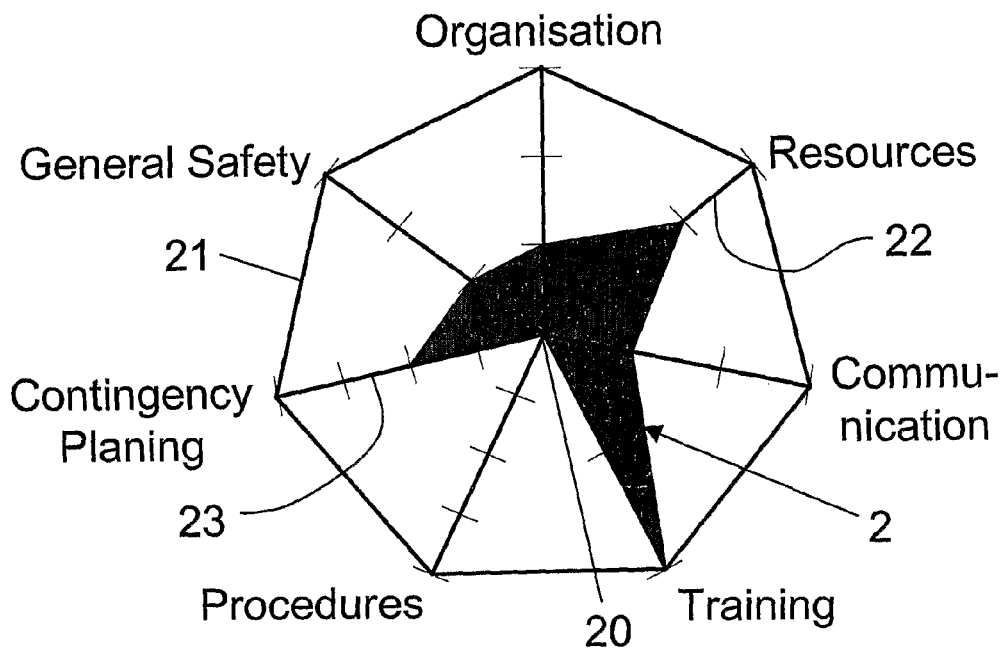
FIG. 4a shows an example of a graphical representation of the safety assessment of a plant's organizational unit generated according to the present invention.
Figure 4B:
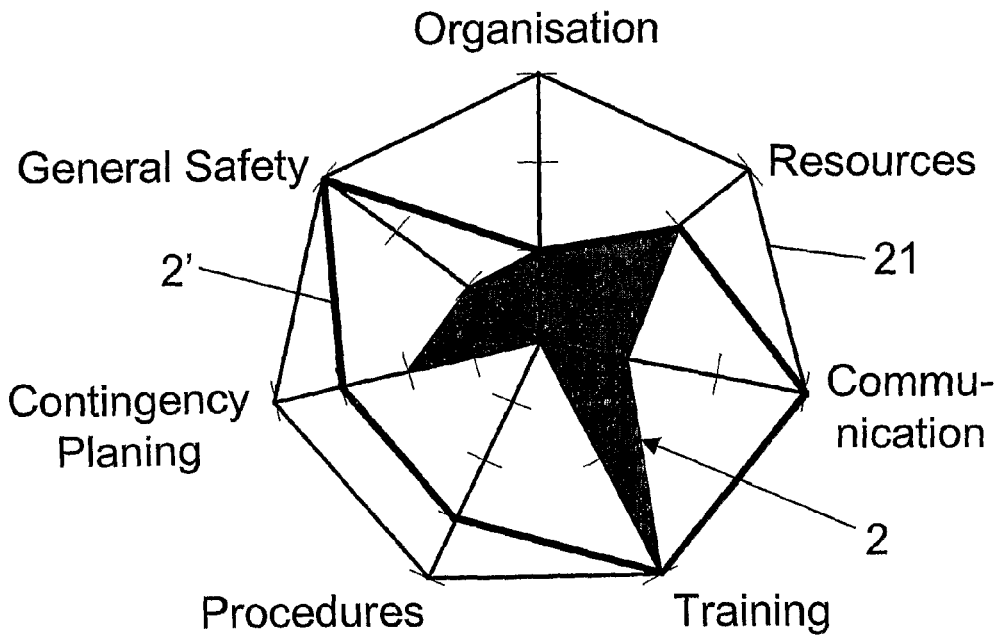
FIG. 4b shows an example of a graphical representation of the safety assessment of a plant's organizational unit at different points in time.

In step S14, output module 15 of computer 1 generates graphical representations of the safety assessment based on the aspect-specific scores determined in steps S1 to S12. The safety assessment of an organizational unit or a plant, respectively, is established by the aspect-specific scores of the organizational unit or the total aspect-specific scores of the plant, respectively. The graphical representations are displayed by computer 1 on display 17 or reproduced as a printed report 5 on printer 4. Preferably, the safety assessment(s) are displayed in one common graph so that deficiencies of the (total) aspect-specific scores from the best-case score are visualized and so that differences between the safety relevant aspects are visualized for the organizational units as well as the plant. As is illustrated in FIGS. 4a and 4b, the graphical representation is preferably in the form of a so-called spider or radar diagram. However, the graphical representation could also be in an alternative form, for example in the form of a bar chart.

Referring to the examples shown in FIGS. 4a and 4b, presented are in a hexagon-shaped spider (radar) diagram the aspect-specific scores for the safety relevant aspects of organization, resources, communication, training, procedures, contingency plan, and general safety. Each of the vertices is assigned to one of the safety relevant aspects. Identical or aspect-specific scales are drawn from the center point 20, indicating a worst-case score, to the vertices. Perimeter 21 indicates the best-case score. The filled-in shape 2 represents the audit or safety assessment with the aspect-specific scores of one of the organizational units or with the total aspect-specific scores of the plant. As can be seen, for the organizational unit or plant, respectively, the displayed audit or safety assessment indicates a worst-case score for the safety aspect of procedures and a best-case score for the safety aspect of training. In FIG. 4b, line 2' represents an example of an audit or safety assessment at a different point in time, e.g. at a later point in time. Form the aspect-specific scores associated with the later audit or safety assessment, it can be seen clearly in the graph of FIG. 4b that the organizational unit or plant, respectively, has undergone significant improvements in the safety relevant aspects of general safety, communication and procedures, while the aspect-specific scores in resources, organization and training were maintained.

Based on the aspect-specific scores, computer 1 generates graphs of the safety assessment for each of the plant's organizational units. Based on the total aspect-specific scores, computer 1 generates a graph of the safety assessment of the plant. For example, the safety assessments are displayed in display 17 on user interface 7. Preferably, in step S14, computer 1 shows in the selection field of the drop down list 71 the identification of the plant selected in step S1. Furthermore, computer 1 selects radio button 73a assigned to drop down list 71 and displays a graph of the current safety assessment of the selected plant in graphic window 75. If safety assessments have not been completed for all the plant's organizational units, computer 1 shows in the selection field of the drop down list 72 the identification of the organizational unit selected in step S3. Furthermore, computer 1 selects the radio buttons 73b assigned to drop down list 72 and displays a graph of the current safety assessment of the selected organizational unit in graphic window 75.

User interface 7 makes it possible for a user to select the audit or safety assessment to be displayed in the graphic window 75. By selecting radio button 73a assigned to drop down list 71, displayed are safety assessments for the overall plant selected in drop down list 71. By selecting radio button 73b assigned to drop down list 72 or by selecting one of the organizational units from drop down list 72, displayed are safety assessments for the organizational unit selected in drop down list 72. If there are multiple audits or safety assessments stored for the plant for different points in time, by checking the appropriate check boxes 74, one or more of the audits are selected to be displayed. By default, displayed is the safety assessment based on the most recent audit for the plant or organizational unit, respectively. In the example shown in FIG. 5, selected for display are the safety assessments based on the first and second audits for the organizational unit "Engineering" of the plant "Process Industry Plant X".

Although the description above is focused primarily on scores associated with answers provided to questions, scores can also be assigned to specific items associated with (safety) inspections. As illustrated in FIG. 3, in addition to data about questions there is also stored and displayed data about inspections, with definitions of inspection items related to one of the safety relevant aspects. Furthermore, in addition to data about answers there is also entered and stored data about inspection results. Consequently, scores are assigned also to inspection items and organizational units, and aspect-specific scores are calculated also based on scores assigned to inspection items.

If the aspect-specific score of an organizational unit is below a defined threshold, computer 1 indicates opportunities for improvement. For example, if the aspect-specific score of the organizational unit "Engineering" with respect to the aspect of "Procedures" is insufficient, as shown in FIG. 5, computer 1 indicates steps and areas of possible improvements. Computer 1 determines the steps and areas of possible improvements depending on the scores assigned to the questions related to the respective safety aspect. Generally, questions with assigned low scores will determine the steps and areas of possible improvements. For example, computer 1 retrieves the steps and areas of possible improvements from a table stored in memory 12. Preferably, the steps and areas of possible improvements are determined by means of an expert system.

What is claimed is:

1. A computer-based method for establishing a safety assessment of a process industry plant including multiple organizational units, the method comprising:
   storing scores in a memory of a computer, each score being related to one of an inspection, undertaken in one of the organizational units with regards to one of multiple defined aspects of the plant, and an answer, given by a human representative of one of the organizational units in response to one of a set of defined questions, each question being related to one of the multiple defined aspects;
   assigning in the computer each of the scores to the respective one of the organizational units and to the respective one of the aspects, the scores being assigned based on a range including a best case score indicative of proactive safety management, intermediate level scores, and a worst case score indicative of an absence of basic requirements;
   calculating, in the computer using a processor, aspect-specific scores for each one of the organizational units from the scores assigned to the respective one of the organizational units and to the respective one of the aspects, the calculated aspect-specific scores for an organizational unit having only intermediate level and best case scores being calculated based on a combination of the assigned scores, and for an organizational unit having at least one worst case score assigned to an aspect, the worst case score for that aspect is assigned as the aspect-specific score for that organizational unit;
   calculating, by the computer, total aspect-specific scores for the plant based on the calculated aspect-specific scores for each of the organizational units; and
   establishing the safety assessment from the total aspect-specific scores for the plant.

2. The method according to claim 1, further comprising generating, by the computer, a graphical representation in one common graph of the safety assessment of a selected one of the organizational units, the aspect-specific scores of the selected one of the organizational units being shown in the graph such that deficiencies of the aspect-specific scores from a best case score are visualized, and such that differences between the aspect-specific scores of the selected one of the organizational units are visualized.

3. The method according to claim 1, further comprising establishing different safety assessments at different points in time; storing, in the computer, the aspect-specific scores associated with the different safety assessments assigned to data about the respective point in time; and generating, by the computer, a graphical representation in one common graph of the different safety assessments of a selected one of the organizational units, such that differences between the aspect-specific scores associated with the different safety assessments of the selected one of the organizational units are visualized.

4. The method according to claim 1, further comprising generating, by the computer, a graphical representation in one common graph of the safety assessment of the plant, the total aspect-specific scores being shown in the graph such that deficiencies of the total aspect-specific scores from a best case total score are visualized, and such that differences between the total aspect-specific scores are visualized.

5. The method according to claim 1, wherein the intermediate level scores include a first level score indicative of a presence of current experience driven process safety management, a second level score indicative of a presence of accepted process safety management practice, and a third level score indicative of a presence of the basic requirements.

6. The method according to claim 1, further comprising storing, in the computer, data about inspections and answers, and determining a rating of the inspection and the answer in the computer by an expert system from the data about inspections and answers.

7. The method according to claim 1, wherein included in the multiple defined aspects of the plant are one or more of an aspect of organization, an aspect of resources, an aspect of communication, an aspect of training, an aspect of procedures, an aspect of contingency plan, and an aspect of general safety.

8. The method according to claim 1, wherein included in the organizational units of the plant are one or more of top management, operation, engineering, inspection, maintenance, and loss prevention.

9. The method according to claim 1, wherein the organizational units relate to hierarchical levels of the plant.

10. The method according to claim 1, wherein the questions include questions related to safety awareness, safety behavior, change management, and human error.

11. A computer system for establishing a safety assessment of a process industry plant including multiple organizational units, the system comprising:
- a recording module for storing scores, each score being related to one of an inspection, undertaken in one of the organizational units with regards to one of multiple defined aspects of the plant, and an answer, given by a human representative of one of the organizational units in response to one of a set of defined questions, each question being related to one of the multiple defined aspects, and for assigning each of the scores to the respective one of the organizational units and to the respective one of the aspects, the scores being assigned based on a range including a best case score indicative of proactive safety management, intermediate level scores, and a worst case score indicative of an absence of basic requirements; and
- a calculation module for
  - calculating aspect-specific scores for each one of the organizational units from the scores assigned to the respective one of the organizational units and to the respective one of the aspects, the calculated aspect-specific scores for an organizational unit having only intermediate level and best case scores being calculated based on a combination of the assigned scores, and for an organizational unit having at least one worst case score assigned to an aspect, the worst case score for that aspect is assigned as the aspect-specific score for that organizational unit,
  - calculating total aspect-specific scores for the plant based on the calculated aspect-specific scores for each of the organizational units, and
  - establishing the safety assessment from the total aspect-specific scores for the plant, wherein
- one of the recording module and the calculation module is implemented as hardware or as a hardware and software combination.

12. The system according to claim 11, further comprising an output module for generating a graphical representation in one common graph of the safety assessment of a selected one of the organizational units, the aspect-specific scores of the selected one of the organizational units being shown in the graph such that deficiencies of the aspect-specific scores from a best case score are visualized, and such that differences between the aspect-specific scores of the selected one of the organizational units are visualized.

13. The system according to claim 11, wherein the calculation module is configured to establish different safety assessments at different points in time; wherein the recording module is configured to store the aspect-specific scores associated with the different safety assessments assigned to data about the respective point in time; and
- wherein the system further comprises an output module for generating a graphical representation in one common graph of the different safety assessments of a selected one of the organizational units, such that differences between the aspect-specific scores associated with the different safety assessments of the selected one of the organizational units are visualized.

14. The system according to claim 11,
- further comprising an output module for generating a graphical representation in one common graph of the safety assessment of the plant, the total aspect-specific scores being shown in the graph such that deficiencies of the total aspect-specific scores from a best case total score are visualized, and such that differences between the total aspect-specific scores are visualized.

15. The system according to claim 11, wherein the recording module is configured to store data about inspections and answers, and wherein the system further includes an expert system configured to determine a rating of the inspection and the answer from the data about inspections and answers.

16. A non-transitory computer-readable storage medium including computer executable instructions, wherein the instructions, when executed by a computer, cause the computer to perform a method, the method comprising:
- storing scores, each score being related to one of an inspection, undertaken in one of multiple organizational units of a process industry plant with regards to one of multiple defined aspects of the plant, and an answer, given by a human representative of one of the organizational units in response to one of a set of defined questions, each question being related to one of the multiple defined aspects;
- assigning each of the scores to the respective one of the organizational units and to the respective one of the aspects, the scores being assigned based on a range including a best case score indicative of proactive safety management, intermediate level scores, and a worst case score indicative of an absence of basic requirements;
- calculating aspect-specific scores for each one of the organizational units from the scores assigned to the respective one of the organizational units and to the respective one of the aspects, the calculated aspect-specific scores for an organizational unit having only intermediate level and best case scores being calculated based on a combination of the assigned scores, and for an organizational unit having at least one worst case score assigned to an aspect, the worst case score for that aspect is assigned as the aspect-specific score for that organizational unit;
- calculating total aspect-specific scores for the plant based on the calculated aspect-specific scores for each of the organizational units; and
- establishing a safety assessment from the total aspect-specific scores for the plant.

17. The non-transitory computer-readable storage medium according to claim 16, further comprising generating a graphical representation in one common graph of the safety assessment of a selected one of the organizational units, the aspect-specific scores of the selected one of the organizational units being shown in the graph such that deficiencies of the aspect-specific scores from a best case score are visualized, and such that differences between the aspect-specific scores of the selected one of the organizational units are visualized.

18. The non-transitory computer-readable storage medium according to claim 16, further comprising establishing different safety assessments at different points in time, storing the aspect-specific scores associated with the different safety assessments assigned to data about the respective point in time, and generating a graphical representation in one common graph of the different safety assessments of a selected one of the organizational units, such that differences between the aspect-specific scores associated with the different safety assessments of the selected one of the organizational units are visualized.

19. The non-transitory computer-readable storage medium according to claim 16, further comprising generating a graphical representation in one common graph of the safety assessment of the plant, the total aspect-specific scores being shown in the graph such that deficiencies of the total aspect-specific scores from a best case total score are visualized, and such that differences between the total aspect-specific scores are visualized.

20. The non-transitory computer-readable storage medium according to claim 16, further comprising storing data about inspections and answers, and determining a rating of the inspection and the answer by means of an expert system from the data about inspections and answers.

* * * * *